United States Patent
Gehring et al.

(10) Patent No.: US 9,980,059 B2
(45) Date of Patent: May 22, 2018

(54) HEARING ASSISTANCE SYSTEM AND METHOD

(71) Applicant: Sonova AG, Stäfa (CH)

(72) Inventors: Stephan Gehring, Uerikon (CH); Daniel Lucas-Hirtz, Rapperswil (CH)

(73) Assignee: Sonova AG, Staefa (CH)

( * ) Notice: Subject to any disclaimer, the term of this patent is extended or adjusted under 35 U.S.C. 154(b) by 0 days. days.

(21) Appl. No.: 15/504,414

(22) PCT Filed: Sep. 15, 2014

(86) PCT No.: PCT/EP2014/069593
§ 371 (c)(1),
(2) Date: Feb. 16, 2017

(87) PCT Pub. No.: WO2014/184395
PCT Pub. Date: Nov. 20, 2014

(65) Prior Publication Data
US 2017/0238103 A1    Aug. 17, 2017

(51) Int. Cl.
*H04R 25/00* (2006.01)
*H04W 4/00* (2018.01)

(52) U.S. Cl.
CPC ......... *H04R 25/552* (2013.01); *H04R 25/505* (2013.01); *H04R 25/554* (2013.01); *H04W 4/008* (2013.01); *H04R 2225/55* (2013.01); *H04R 2460/03* (2013.01)

(58) Field of Classification Search
CPC .. H04R 25/505; H04R 25/552; H04R 25/554; H04R 2225/55; H04R 2460/03
See application file for complete search history.

(56) References Cited

U.S. PATENT DOCUMENTS

| | | |
|---|---|---|
| 8,041,066 B2 | 10/2011 | Solum |
| 8,050,439 B2 | 11/2011 | Inoshita et al. |
| 8,150,323 B2 | 4/2012 | Kim |
| 8,155,335 B2 | 4/2012 | Rutschman |
| 8,300,864 B2 | 10/2012 | Müllenborn et al. |
| 8,526,648 B2 | 9/2013 | Dijkstra et al. |

(Continued)

FOREIGN PATENT DOCUMENTS

| | | |
|---|---|---|
| EP | 2 458 743 A1 | 5/2012 |
| WO | 2010/008861 A2 | 1/2010 |

(Continued)

*Primary Examiner* — Mark Fischer

(57) ABSTRACT

A hearing assistance system, having first and second hearing devices worn at respective ears of a user, each hearing device having a BLUETOOTH® interface for wireless reception from an external audio source device, the hearing devices being adapted to establish a binaural data link between each other, wherein the hearing devices are adapted to define first and second sets of BLUETOOTH® profiles assigned to the first and second hearing devices respectively, with the first set and the second set differing by at least one profile, wherein the first devices are adapted to establish a BLUETOOTH® connection to an external device and to advertise their BLUETOOTH® profile to the external device, wherein the hearing devices are adapted to modify, by data exchange via the binaural link, the first and second set of BLUETOOTH® profiles by moving at least one of the profiles from one of the sets to the other set.

23 Claims, 6 Drawing Sheets

(56) References Cited

U.S. PATENT DOCUMENTS

| | | | |
|---|---|---|---|
| 8,706,038 | B2 | 4/2014 | Sharma |
| 8,712,083 | B2 | 4/2014 | Solum |
| 9,002,044 | B2 | 4/2015 | Dinescu et al. |
| 2009/0197532 | A1 | 8/2009 | Wyper |
| 2010/0167652 | A1 | 7/2010 | Hsu |
| 2011/0158441 | A1 | 6/2011 | Batra |
| 2013/0316642 | A1* | 11/2013 | Newham ........... H04W 52/0206 455/11.1 |
| 2014/0341399 | A1* | 11/2014 | Dusse ...................... H04R 5/04 381/150 |
| 2016/0157026 | A1* | 6/2016 | Guindi ................. H04R 25/305 381/60 |

FOREIGN PATENT DOCUMENTS

| | | |
|---|---|---|
| WO | 2011/027004 A2 | 3/2011 |
| WO | 2014/094859 A1 | 6/2014 |

* cited by examiner

HEARING ASSISTANCE SYSTEM AND METHOD

BACKGROUND OF THE INVENTION

Field of the Invention

The invention relates to a hearing assistance system, comprising a first hearing device to be worn at a first one of a user's ears, and a second hearing device to be worn at a second one of the user's ears, with each hearing device being adapted to establish a binaural data link between the first hearing device and the second hearing device and comprising a BLUETOOTH® ("BT") interface for wireless reception of an external audio data stream from an external device, such as a phone device.

Description of Related Art

When transporting audio, BLUETOOTH® Classic profiles, such as the Advanced Audio Distribution Profile (A2DP) or the Hands Free Profile (HFP), offer a point-to-point link from an audio source to an audio destination.

Typically, the interface for binaural communication, which may use an inductive link, is a short range interface having lower power consumption than the BLUETOOTH® interface.

Since power consumption is an issue for ear level devices, binaural hearing assistance systems have been developed, wherein the external audio stream is received only by one of the hearing devices via the long range interface and is forwarded to the other device via the binaural short range interface.

U.S. Pat. No. 8,300,864 B2 relates to a binaural hearing aid system, wherein an audio stream from a telephone device is transmitted via a short range inductive link to one of the hearing aids and is forwarded via a second wireless link which is used by the hearing aids to exchange data to the other hearing aid.

U.S. Pat. No. 8,041,066 B2 relates to a binaural hearing aid system, wherein one of the two stereo channels received by one of the hearing aids via a wireless link is forwarded to the other hearing aid via a wireless link.

Other examples wherein an audio stream received via a BT link from an audio source is relayed to the other ear are described in U.S. Pat. Nos. 8,706,038 B2, 9,002,044 B2 and 8,155,335 B2, wherein the binaural link likewise may be a BT link (U.S. Pat. Nos. 8,706,038 B2 and 9,002,044 B2) or may be an NCF link (U.S. Pat. No. 8,155,335 B2)

U.S. Patent Application Publication 2009/0197532 A1 relates to a pair of earphones, wherein in a first mode one of the earphone receives an audio stream via a BT link from a mobile phone and relays it via a different wireless link to the other earphone, and wherein in a second mode the roles of the earphones are interchanged; switching between the two modes occurs according to the battery levels of the earphones in order to achieve balanced battery drain.

U.S. Patent Application Publication US 2011/0158441 A1 relates to similar system comprising a pair of BT earphones, wherein the wireless link connecting the earphones is a BT link like the BT link via which the audio stream from the mobile phone is received; the roles of the earphones are switched according to the respective battery levels.

U.S. Pat. No. 8,526,648 B2 relates to a binaural hearing assistance system, wherein an audio signal from a wireless microphone is transmitted to the hearing devices, wherein the link quality to each hearing device is monitored, and wherein the signal received via the better link is relayed via a binaural link to the other hearing device.

International Patent Application Publication WO 2010/008861 A2 relates to a network system, wherein information concerning the BT protocols/services available for a device of the system is communicated to other devices in the network via another network link, such as WiFi.

U.S. Patent Application Publication US 2010/0167652 A1 relates to a system comprising a mobile phone and a BT headset, where there is an internal protocol switching in the mobile phone depending on the use situation.

According to U.S. Pat. No. 8,150,323 B2, the BT connection from a mobile phone to a headset may be changed according to the presence of a phone call from a simplex to a duplex mode when music is played.

U.S. Pat. No. 8,050,439 B2 relates to a binaural hearing system, wherein a bidirectional wireless link between the two hearing aids as used to exchange information concerning the battery charge status of each hearing aid in order to reduce power consumption of the hearing aid having the lower remaining battery lifetime once the difference of the remaining battery charges exceeds a certain limit.

U.S. Pat. No. 8,712,083 B2 relates to data logging in a wireless hearing aid system in order to modify link parameters in a manner to enhance reliability and link quality.

SUMMARY OF THE INVENTION

It is an object of the invention to provide for a binaural hearing assistance system which is able to receive an external audio stream in a robust manner via a standard BT link from an external device, such as a mobile phone, wherein the battery lifetime and device lifetime may be maximized. It is a further object to provide for a corresponding hearing assistance method.

According to the invention, these objects are achieved by a hearing assistance system and a hearing assistance method as described herein.

The invention is beneficial in that, by modifying the set of BT profiles advertised by each hearing device to the external device in a synchronized manner according to the fulfillment of given mode switching criteria, the hearing devices may switch their roles taken with regard to the communication with the external device in flexible manner in response to various usage scenarios, while both hearing devices may stay connected with the external device. Keeping both hearing devices connected to the external device enables particularly rapid role switching and ensures that the external device may inform the user that both hearing devices stay connected to the external device, thereby avoiding confusion of the user. The role switching may serve to balance power consumption and wear of the hearing devices and to maintain connectivity, by relaying of audio streams to the other ear, for example in case of a weak BT link to one of the hearing devices.

The BT link preferably uses BT Classic.

Hereinafter, examples of the invention will be described with reference to the accompanying drawings.

DETAILED DESCRIPTION OF THE INVENTION

Figure 1:
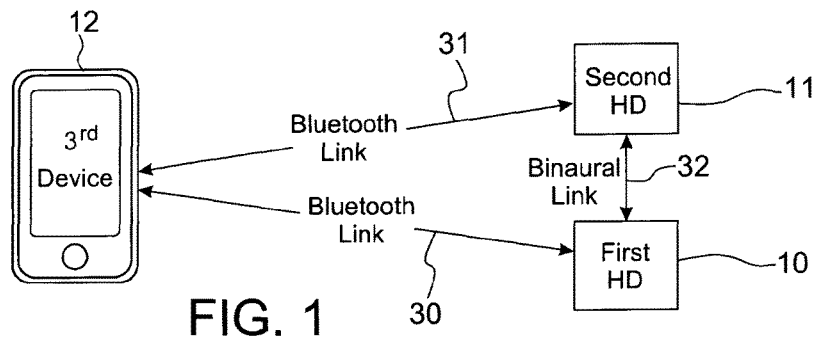
FIG. 1 is a schematic representation of an example of a hearing assistance system according to the invention.

FIG. 1 is a schematic representation of an example of a hearing assistance system according to the invention, comprising a first hearing device 10 to be worn at one ear of a user, a second hearing device 11 to be worn at the other ear of the user and an external device 12, wherein the first and second hearing devices 10, 11 may communicate with each other via a binaural link 32 and with the external device 12 via a respective BLUETOOTH® link 30, 31.

Figure 2:
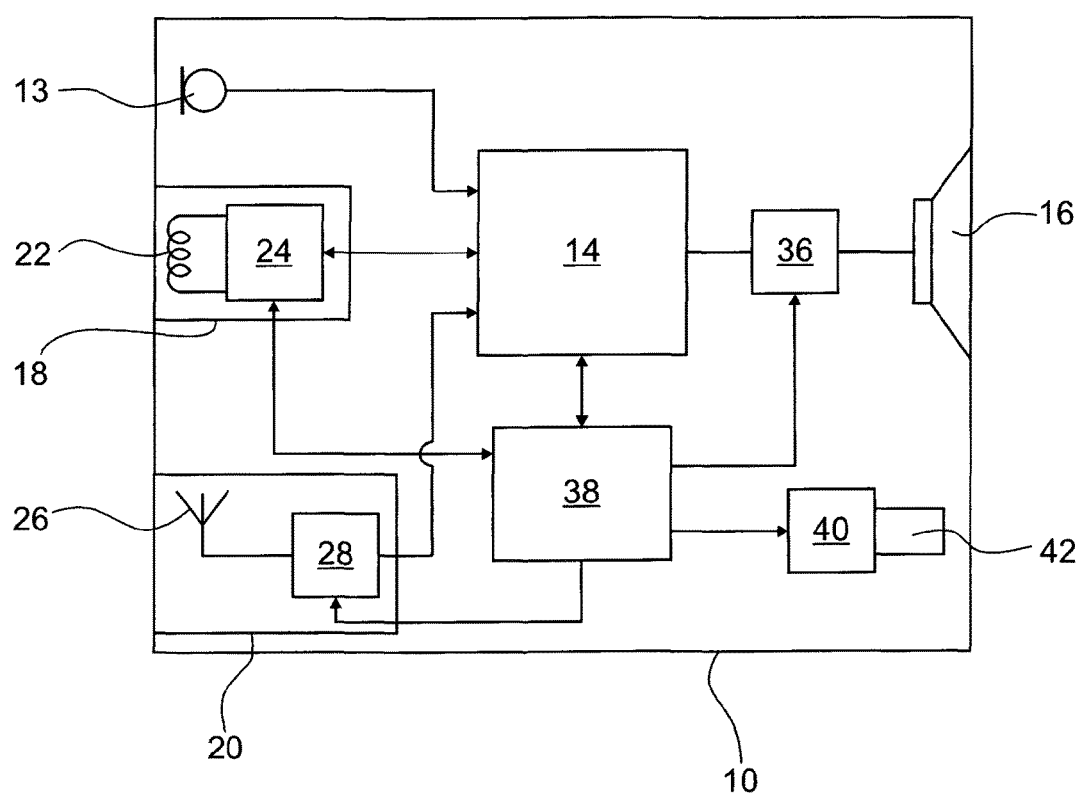
FIG. 2 is a block diagram of an example of a hearing device to be used in a hearing assistance system according to the invention.

FIG. 2 shows a block diagram of an example of a hearing device 10 forming part of a hearing assistance system according to the invention shown in FIG. 1, wherein one such device 10 is to be worn at a first one of a user's ears for stimulating the first ear and a second such device is to be worn at the other of the user's ears for stimulating the other ear (the two devices are designated by 10 and 11 in FIG. 1).

Preferably, the hearing device 10 is a hearing instrument, such as a BTE (behind the ear), ITE (in the ear) or CIC (completely in the channel) hearing aid. However, the hearing devices, for example, also could be an auditory prosthesis, such as a cochlear implant device. According to another example, the hearing devices could form a headset or headphones for a normal hearing person.

According to the example of FIG. 2, the hearing device 10 is an electro-acoustic hearing aid comprising a microphone arrangement 13 for capturing audio signals from ambient sound, an audio signal processing unit 14 for processing the captured audio signals and an electro-acoustic output transducer (loudspeaker) 16 for stimulation the user's hearing according to the processed audio signals.

The hearing instrument 10 also comprises a first wireless interface 18 and a second wireless interface 20. Typically, the first interface 18 is designed for a shorter range and a lower power consumption than the second interface 20; accordingly. The first interface 18 comprises an antenna 22 and a transceiver 24, and the second interface comprises an antenna 26 and a transceiver 28.

The first interface 18 is provided for enabling wireless data exchange between the first hearing instrument 10 and the second hearing instrument 11 via a wireless link 32 which preferably is an inductive link which may operate, for example, in a frequency range of 6.765 MHz to 13.567 MHz, such as at 10.6 MHz. However, rather than being implemented as an inductive link, the wireless link 30 in principle also could be far-field link typically requiring a lower power consumption than the link of the second interface 20, such as a power optimized proprietary digitally modulated link operating in the 2.4 GHz ISM band. According to further, less preferred alternative the binaural link 32 even may be a wired link, such as a CROS (Contralateral Routing of Signal) link.

In particular, the first interface 18 may be designed to form part of a hearing instrument body area network (HIBAN). In particular, the hearing instruments 10, 11 may exchange audio data and/or parameter settings/commands required for binaural operation of the two hearing instruments 10, 11, for example, in a master-slave configuration.

The second interface 20 is provided for exchanging data via a Bluetooth link 30, 31 with the external device 12.

In the case that the binaural link 32 is a wireless link, the protocol/interface for the binaural link 32 and the BT links 30, 31 may be the same (in this case the interface 20 used for the binaural link 32 also could be used for data reception from the external device 12 via the links 30, 31) or it may be different (requiring two separate interfaces 18, 20 for the links 32 and 30/31, respectively).

Preferably, the external data stream is an audio data stream which may be mono stream or a stereo stream. The external device 12 typically is a phone device, such as a mobile phone, a DECT phone device or an internet phone device ("Voice over IP"). Alternatively, it may be other type of electronic media/communication device, such as a personal computer, a tablet computer, a radio device, a music/media player, a HiFi set, a TV set, a wireless microphone or a generic remote control. According to a further alternative, it may be a public address/announcement system (like in an airport or a place of worship).

The hearing instrument 10 also may comprise a controller 38 for controlling operation of the hearing instrument 10, with the controller 38 acting on the signal processing unit 14, the transceivers 24 and 28.

The hearing instrument 10 also may comprise a unit 40 for determining the charging status of the battery 42 of the hearing instrument 10, which provides a corresponding battery charge status signal to the controller 38.

Figure 3:
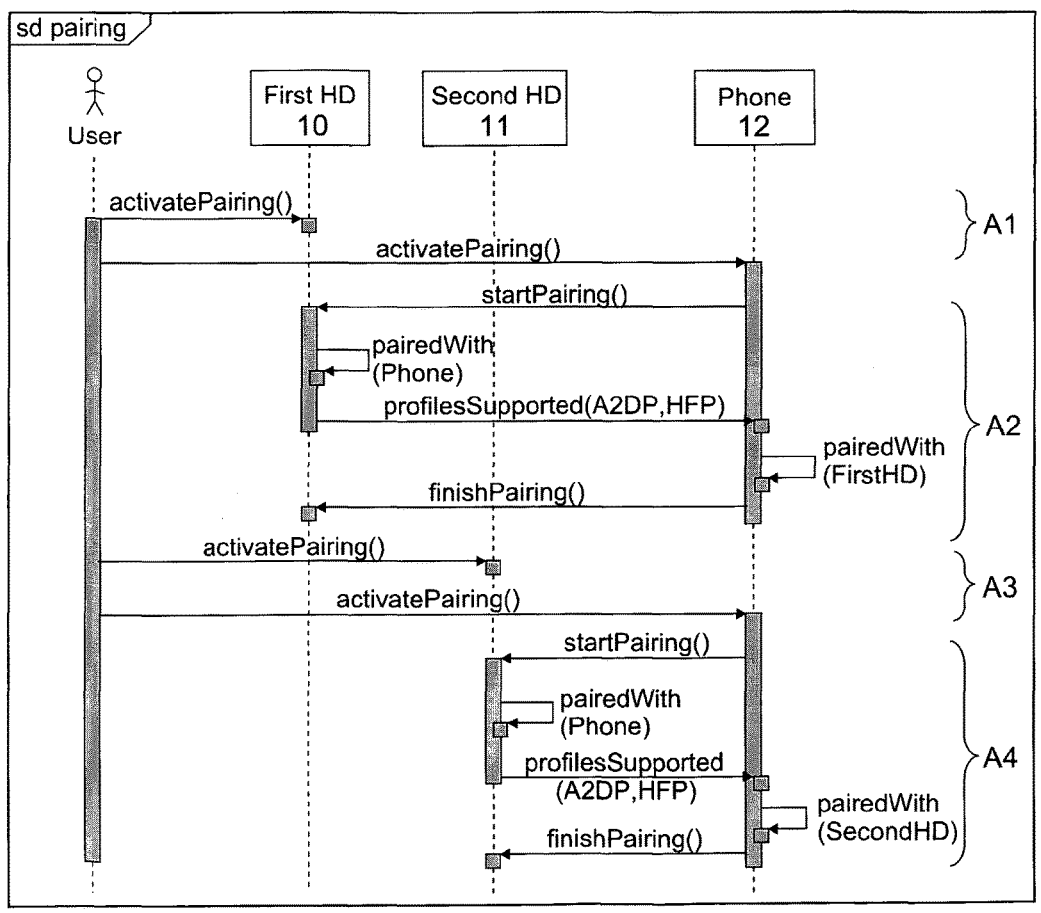
FIG. 3 is a message sequence chart of an example of a pairing process of a hearing assistance system according to the invention.

In FIG. 3, a message sequence chart of an example of a pairing process of the system of FIG. 1 is shown, wherein the user first may initiate pairing between the first hearing device 10 and the external device 12 (step A1), whereupon the external device 12 and the first device 10 pair, with the first device 10 informing the external device 12 with regard to the BT profiles supported by the first device 10 (step A2).

In the example illustrated in FIGS. 1 to 7, it is assumed that both devices 10, 11 support the "Advanced Audio Distribution Profile" (A2DP) which is suitable for audio streaming from one BT device to another BT device (in the present example, it may be used for streaming of a mono or stereo audio stream, such as music, from the external device 12 to the hearing devices 10, 11), and the "hands-free profile" (HFP) which is suitable for using a headset in phone calls (in the present example, the external device 12 is a phone device which may use the devices 10, 11 as a phone headset). Both profiles offer a point-to-point link from an audio source to an audio destination.

After pairing of the external device 12 with the first device 10, the user may initiate pairing of the external device 12 with the second device 11 (step A3), whereupon the external device 12 and the second device 12 pair, with the second device informing the external device 12 that it supports the A2DP and HFP profiles (step A4).

Before or after pairing with the external device 12, the first and second devices 10, 11 define, by data exchange via the binaural link 32, a first set of BT profiles assigned to the first device 10 and a second set of BT profiles assigned to the second device 11, wherein the first set and second set are different in that they differ by at least one profile. When establishing a connection between the respective hearing device 10, 11 and the external device 12, the hearing device advertises the BT profiles presently assigned to it to the external device 12, with the external device 12 then selecting the respective hearing device 10, 11 for a certain role/task in conformity with the advertised profiles. Thus, the roles taken by the hearing assistance devices 10, 11 may be changed/switched by modifying the respective set of BT profiles assigned to the respective hearing device 10, 11 (and subsequently advertising the modified set of profiles to the external device 12)—typically in response to the changes in the use conditions of the system—, while both devices 10, 11 may stay connected to the external device 12, as will be illustrated in more detail below.

Thus, "advertising a set of BT profiles" is to be understood such that it relates to a process wherein one of the hearing devices communicates to the external device 12 via the respective BT link that from now on the hearing device supports exclusively the BT profiles listed in the advertised set of profiles; according to the present invention, the purpose of advertising a modified set of profiles differing by at least one profile from the previously advertised set of profiles is to trigger/initiate a change of the role taken by the hearing device with regard to the external device 12. The external device, after having received the advertising message may carry out the role change immediately or with same delay.

It is also to be understood that a "set of BT profiles" generally may include any number of profiles; in particular, the set may include no profile at all, i.e., the set may be empty.

While FIG. 3 is a high level overview of the pairing process, it is to be understood that the pairing process may include other features; for example, the pairing process can be synchronized between the two devices 10, 11 in order to ensure that there is at least a certain time period between the individual pairing process of each device 10, 11; in such case, the device 10, 11 which is paired first, may notify the other device of the successful pairing, and the other device then may wait for a certain time interval before it activates its own pairing process.

Figure 4:
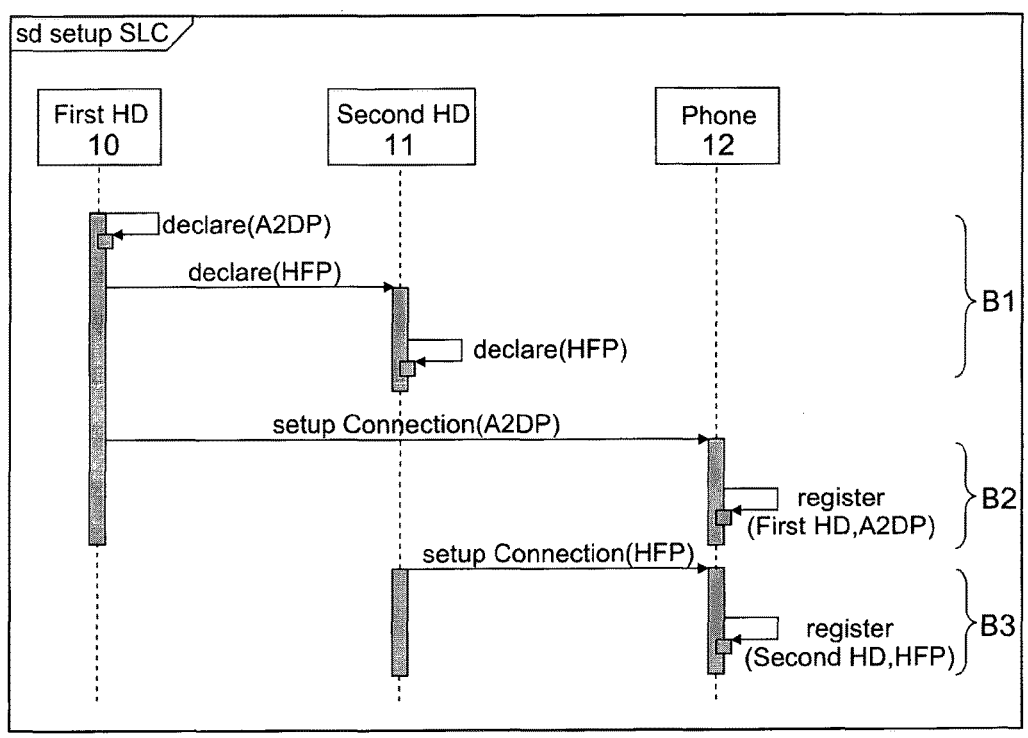
FIG. 4 is a message sequence chart of an example of a process for setting up a connection in a hearing assistance system according to the invention.

FIG. 4 is a message sequence chart of an example of a process for setting up a connection between each device 10, 11 and the external device 12, wherein the first and second device 10, 11 define a first set of BT devices assigned to the first device 10 and a second set of BT profiles assigned to the second device 11; in the example, the first set consists of the A2DP profile, and the second set consists of the HFP profile, with the definition of the set of profiles being achieved by a corresponding message sent from the first device 10 via the binaural link 32 to the second device 11 (see step B1).

Thereafter, the first device 10 sends a message via the BT link 30 to the external device 12 which advertises the A2DP profile to the external device 12 for being used in the connection (Step B2), and the second device 11 sends a corresponding message via the BT link 31 to the external device 12 advertising the HFP profile to the external device 12 for being used in the connection (step B3), with the external device 12 registering the respective profiles for use with the respective hearing device10 and 11, respectively.

Based on such profile setting, the external device 12 will use the first device 10 as the recipient for audio streaming (such as stereo music streaming), whereas it will use the second device 11 as a headset for phone calls.

Figure 5:
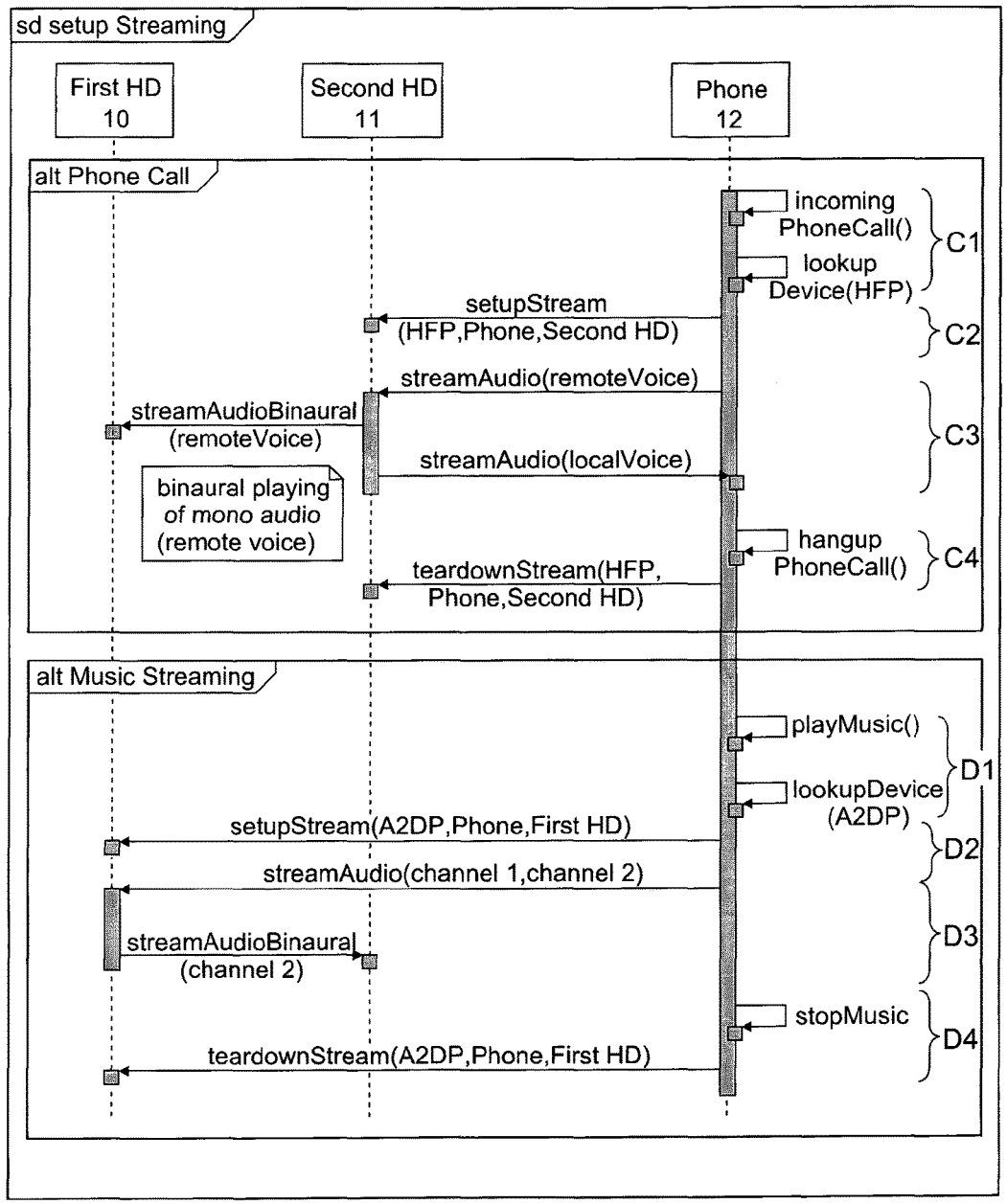
FIG. 5 is a message sequence chart of two examples of an audio streaming process in a hearing assistance system according to the invention.

FIG. 5 is a message sequence chart of corresponding audio signal exchange processes, with the upper part of FIG. 5 showing a message sequence chart during a phone call, and with the lower part of FIG. 5 showing a message sequence chart during music streaming.

According to the first (upper) example of FIG. 5, the external device 12 recognizes an incoming phone call and looks for a device having advertised availability of the HFP profile to the external device 12 before, with the external device 12 accordingly selecting the second device 11 for being used as a headset for the present phone call (step C1). The external device 12 then sets up an audio exchange connection with the second device 11 using the HFP profile (step C2). After having set up the connection, the external device 12 transmits the received remote voice signal to the second device 11, which generates corresponding sound at the respective ear and in addition relays the received audio stream via the binaural link 32 to the first device 10 which generates corresponding sound at the other ear. When the user of the devices 10, 11 speaks, the microphone arrangement 20 of the second device 11 may capture the user's voice and may transmit a corresponding audio stream via the BT link 31 to the external device 12 (step C3); alternatively, it would be possible to capture the user's voice by the microphone arrangement 20 of the first device 10 and to route the that microphone input of device 10 via the binaural link to device 11 and from there to device 12, but, since that variant would incur a higher delay, it is less preferred. Thereby, binaural playback of a mono audio signal corresponding to remote voice is realized. At the end of the phone call, the audio connection using the HFP profile is torn down (step C4).

In the second (lower) example of FIG. 5, the external device 12, upon a request to play music, looks for a device having advertised support of the A2DP profile before and accordingly selects the first device 10 (step D1). Thereafter, the external device 12 sets up an audio streaming connection to the first device 10 using the A2DP profile (step D2) and streams a stereo audio signal via the BT link 30 to the first device 10 which generates sound corresponding to one of the two channels and relays the other channel via the binaural links 32 to the second device 11 which generates sound corresponding to the other channel at the other ear (step D3). At the end of the music playing action, the audio streaming connection is torn down by the external device 12 (step D4).

Figure 6:
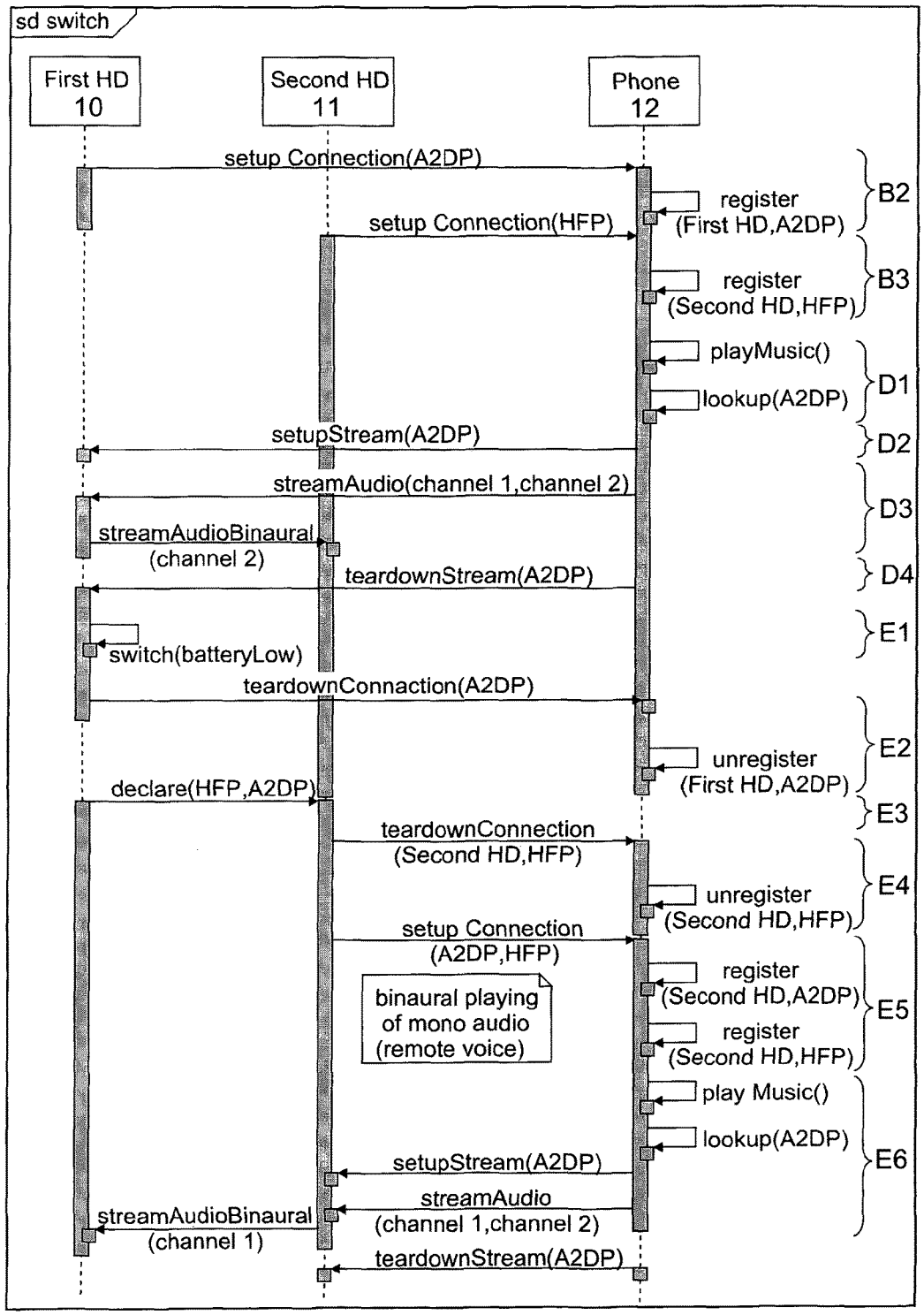
FIG. 6 is a message sequence chart of an example of a role switching process in a hearing assistance system according to the invention.

FIG. 6 shows a message sequence chart of an example of a role switching process. The upper part of FIG. 6 includes a repetition of steps B2 and B3 of FIG. 4 (first device 10 advertising A2DP profile, second device 11 advertising HFP profile), and of steps D1 to D4 of FIG. 5 (playing music via the first device 10). In step E1 the first device 10 recognizes that a certain mode switching criterion is fulfilled, namely that the remaining battery capacity has decreased below a certain threshold (as indicated by the unit 40), whereupon the first device 10 decides to initiate a mode switching in order to balance battery drain with the second device 11. To this end, the first device 10 sends via the BT link 30 a message to the external device 12 for tearing down the A2DP connection, whereupon the external device 12 changes the registration of the first device 10 accordingly (step E2); further, the first device 10 sends, via the binaural links 32, a message to the second device 11 to modify the profile sets accordingly, i.e. the A2DP profile is moved from the first set of profiles assigned to the first device 10 to the second set of profiles assigned to the second device 11, so that the first set after this modification no longer includes any profile, whereas the second set of profiles now includes both the HFP profile and the A2DP profile (step E3).

The expression "moving a profile from one set to another set" is to be understood such that, when modifying the first and second set of profiles, a certain profile, such as the HFP, which was exclusively included in one of the sets, e.g., in the first set but not in the second set, prior to the modification will be included, after the modification, exclusively in the other set, e.g., in the second set but no longer in the first set. In particular, such "moving of a profile" relates to changing of entries/items on lists (i.e., the sets), but does not include any physical movement of the profile as such.

Thereafter, the second device 11 sends a message to the external device 12 to tear down the AFP connection (step E4) in order to enable a "re-start" of the connection based on the modified sets of profiles. In the example of FIG. 6, the second device 11 now takes over all profiles and sends a corresponding message to the external device 12 in order to set up a connection based both on the A2DP and AFP profile, which is registered accordingly by the external device 12 (step E5).

When now the external device 12 is requested to play music, it will select the second device 11, rather than the first device 10, as the audio stream recipient in order to set up a corresponding audio stream, with the second device 11 now relaying the respective audio channel via the binaural link 32 to the first device 10 (step E6).

Figure 7:
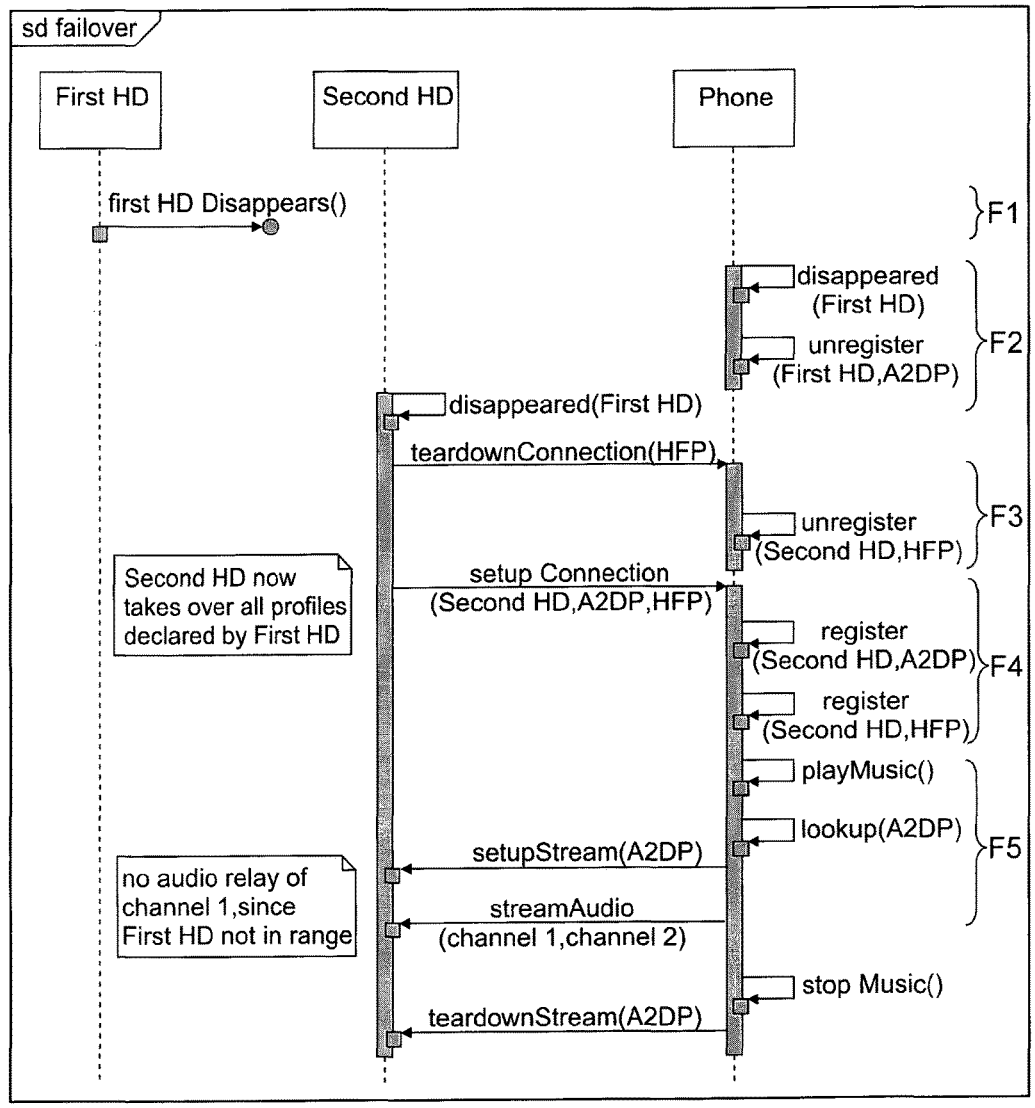
FIG. 7 is a message sequence chart of another example of a role switching process in a hearing assistance system according to the invention.

FIG. 7 shows a message sequence chart of another example of a role switching between the first and second device 10, 11. In the example of FIG. 7, the first device 10 "disappears" in the sense that the second device 11 no longer receives messages from the first device 10 (e.g., because the battery of the first device 10 has run out), in particular messages concerning the distribution of the roles of the two devices 10, 11 (step F1); also the external device 12 no longer receives messages from the first device 10. Such "loss" of the first device 10 is registered by both the external device 12 and the second device 11 (step F2). As a consequence, the second device 11 sends a message to the external device 12 in order to tear down the existing HFP connection (step F3), with the second device 11 now taking over all profiles advertised by the first device 10 and establishing a corresponding new connection with the external device 12 based on both the A2DP profile and the HFP profile (step F4).

When the external device 12 now is requested to play music, it will select the second device 11, rather than the first device 10, as an audio stream recipient and will send a stereo audio stream to the second device 11 (step F5); in this regard it is to be noted that, since the first device 10 presently is not in the range of the binaural link 32, no relaying of the respective audio channel to the first device 10 will take place. In such case the second device 11 may down-mix the received stereo audio signal to a mono signal.

Preferably, a mode/role switching process (which is initiated by corresponding advertising of modified sets of profiles to the extended device 12) takes place only during times when there is no audio streaming to or from the hearing assistance devices via the BT link 30, 31, thereby avoiding interruptions of the sound generated from the streamed audio signals. However, in some cases it might be not desirable to wait until the present audio streaming phase is terminated, for example if the device acting as the audio stream recipient is "lost". In such cases a mode switchover may happen during audio streaming. In order to avoid an interruption of the sound created from the audio stream, the audio stream receiving device may buffer the received audio data sufficiently (at the penalty of introducing a larger audio latency) so that during the time interval required to trigger the other device to take over the audio streaming link and to establish the link by the other device the buffered data is sufficient to continue the sound generation.

The expression "mode switching criterion" is to be understood as designating a certain event which has to be found to take place (or a condition which has to be found to be fulfilled), such as a certain parameter reaching a certain limit/threshold, so that a certain role/task attributed to one of the hearing devices should be changed, e.g., transferred to the other hearing device. That is, the fulfillment of a "mode switching criterion" will trigger some kind of mode switching of the respective hearing device.

The mode switching criterion, i.e., the event triggering a mode switching action, may include a plurality of parameters/events: one of the parameters may be a parameter indicative of the quality of the BT link 30, 31 between the respective hearing device 10, 11 and the external device 12; for example, such link quality parameter may be an RSSI value, an amount of packet errors or a bit error rate, with the mode switching being initiated once the respective link quality parameter falls below a given threshold.

According to another example, the parameters may include a parameter indicative of the remaining battery capacity of the respective device, for example the present battery voltage, wherein mode switching is initiated once the remaining battery capacity falls below a given threshold value. In this regard, the devices 10, 11 may take into account not only the remaining battery capacity of one of the devices 10, 11, but the remaining battery capacity of both devices 10, 11 in order to take a joint decision regarding the role switching; however, according to an alternative, one of the devices 10, 11 may unilaterally declare that the roles should be switched because its power is too low.

In case of low power, the respective device 10, 11 may first only turn off the BT link 30, 31 (with the other device taking over the respective protocols), while still maintaining the binaural link to the other device 11, 10 in order to be able to receive a relayed audio stream and/or control traffic (this is appropriate in case that the binaural link 32 consumes less power than the BT link 30, 31); once the remaining power reaches a second threshold lower than the first power threshold, the respective device 10, 11 may declare that it is now going offline and will not even support the binaural link 30.

In the case that one of the devices 10, 11 went offline with regard to its BT link 30, 31, the external device 12 may notify, for example visually, the user accordingly, or it may notify via the BT link the other device that there is a connectivity problem, so that the other device may take over the profiles and relay the received audio data via the binaural link 32 to the device having the connectivity problems.

Instead of dynamically determining the remaining power of the devices 10, 11 via the unit 40, an appropriate duty cycle may be determined according to the expected power consumption of the devices 10, 11, with the mode switching then occurring according to such duty cycle, i.e., the mode is switched once a respective time interval determined by the duty cycle lapses. Such duty cycle may take into account, for example, that one of the devices 10, 11 has a significantly higher basic power consumption than the other due to an asymmetric hearing loss of the user, in which case the other device 11, 10 has to take more of the BT communication tasks (such as the audio streaming).

According to another approach, the total use time of each of the profiles in each of the devices 10, 11 may be recorded and may be used to determine the times when a mode switching should occur; in such case, mode switching would be triggered by the lapse of a certain time interval determined by the recorded total profile use times.

According to a more simple approach the devices 10, 11 may unconditionally switch the advertised profiles after or before each connection setup; alternatively, mode switching may be triggered by setup or tear down of an audio streaming process.

As already mentioned above, according to a further alternative approach, mode switching may be triggered by receipt of a respective switching message from the external device 12. In general, the decision to change the mode may be taken by one of the devices 10, 11 alone, or the devices 10, 11 may exchange status data via the binaural link 32 prior to deciding on mode switching (i.e. prior to deciding that a mode switching criterion is fulfilled); in particular, the devices 10, 11, may periodically exchange such status data via the binaural link 32.

Such periodic exchange of status data may be used as "keep-alive" messages in order to detect whether the other device is still in range of the binaural link 32.

According to one example, the devices 10, 11 may record parameters relating to the mode switching/modifications of the sets of profiles; for example, the devices 10, 11 may record the time when the last advertising of the sets of parameters to the external device occurred (e.g., the time of the last switchover may be persistently recorded).

Preferably, when one of the devices 10, 11 which has been "lost", later on "re-appears", the devices 10, 11 may re-synchronize and redistribute the profiles according to the distribution before the "loss".

According to one example, in case of a role switching triggered by low power of one of the devices 10, 11, at least the least power consuming profile may remain in the set assigned to the device having the low power state, while at least one of the more power consuming profiles, in particular the most power consuming profile, is moved to the profile set assigned to the other device.

What is claimed is:

1. A hearing assistance system, comprising a first hearing device to be worn at a first one of a user's ears for hearing stimulation of the first ear, and a second hearing device to be worn at a second one of the user's ears for hearing stimulation of the second ear,
   each hearing device comprising a BLUETOOTH® interface for wireless reception of an external audio data stream from an external audio source device,
   the hearing devices being adapted to establish a binaural data link between the first hearing device and the second hearing device,
   wherein the hearing devices are adapted to define, by data exchange between the hearing devices via the binaural link, a first set of BLUETOOTH® profiles assigned to the first hearing device and a second set of BLUETOOTH® profiles assigned to the second hearing device, with the first set and the second set differing by at least one profile,
   wherein the first hearing device is adapted to establish a BLUETOOTH® connection to the external device and to advertise the first set of BLUETOOTH ® profiles to the external device, and wherein the second hearing device is adapted to establish a BLUETOOTH® connection to the external device and to advertise the second set of BLUETOOTH® profiles to the external device,
   wherein the hearing devices are adapted to modify, by data exchange via the binaural link, the first and second set of BLUETOOTH® profiles by moving at least one of the profiles from one of the sets to the other set in order to obtain a modified first set of profiles and a modified second set of profiles, once at least one of the hearing devices finds a given mode switching criterion to be fulfilled, and to advertise the modified first and second set of profiles to the external device, respectively.

2. The system of claim 1, wherein each hearing device supports at least one profile suitable for receipt of audio streaming, and wherein the external device is adapted to select that one of the hearing devices as a recipient for audio streaming whose set of profiles advertised to external device includes said at least one profile suitable for receipt of audio streaming.

3. The system of claim 1, wherein each hearing device supports at least one profile suitable for headset use in phone calls, and wherein the external device is adapted to select that one of the hearing devices as a headset for phone calls whose set of profiles advertised to external device includes the at least one profile suitable for headset use in phone calls.

4. The system of claim 3, wherein each hearing device comprises at least one microphone for capturing audio signals from a user's voice and is adapted to transmit such audio signals via the interface to the external device when selected by the external device as a headset for phone calls.

5. The system of claim 1, wherein each hearing device is adapted to relay audio data received from the external device to the other hearing device via the binaural link.

6. The system of claim 5, each hearing device is adapted to relay audio data of a stereo channel received from the external device to the other hearing device via the binaural link (32).

7. The system of claim 1, wherein each hearing device is adapted to advertise its assigned set of profiles to the external device upon pairing, connecting and/or re-connecting to the external device.

8. The system of claim 1, wherein each hearing device is adapted to advertise a modified first and second set of profiles to the external device only during times when there is no audio streaming to or from the hearing devices via the interface in order to avoid interruptions in audio streaming due to the modifications of the first and second set of profiles.

9. The system of claim 1, wherein the mode switching criterion includes at least one of: a parameter indicative of the quality of the BLUETOOTH® link between the respective hearing device and the external device; a parameter indicative of the remaining battery capacity of the respective hearing device; the lapse of a given time interval; occurrence of a setup of the connection to of the respective hearing device to the external device; beginning or end of an audio streaming to or from the respective hearing device via the second interface; receipt of a switching message from the external device; and booting of a hearing device.

10. The system of claim 9, wherein the given time interval is determined by the an accumulated use time of one of the profiles by the hearing device accumulated since the first time the profile was used.

11. The system of claim 9, wherein the given time interval is determined by a duty cycle defined according to expected power consumption of the hearing devices.

12. The system of claim 9, wherein the parameter indicative of the quality of the BLUETOOTH® link is an RSSI value, an amount of packet errors, or a bit error rate.

13. The system of one of claims 9, wherein the mode switching criterion in addition to the remaining battery capacity of the respective hearing device also includes the remaining battery capacity of the other hearing device.

14. The system of claim 9, wherein the hearing devices are adapted to exchange status data via the binaural link prior to deciding that the mode switching criterion is fulfilled.

15. The system of claim 14, wherein the hearing devices are adapted to periodically exchange status data via the binaural link.

16. The system of claim 1, wherein the hearing devices are adapted to record parameters relating to modifications of the sets of profiles.

17. The system of claim 1, wherein, when the sets of profiles are modified, at least a least power consuming profile remains in the set, while at least one of more power consuming profiles is moved to the other set.

18. The system of claim 1, wherein each hearing device is adapted to take over all profiles of the other set into its own set in case it finds that the other hearing device lost its connection to the external device and/or its connection via the binaural link and to redistribute the profiles onto the sets once it finds that the other hearing device has restored its lost connection.

19. The system of claim 18, wherein each hearing device is adapted to mix down a stereo audio stream received from the external device in case it finds that the hearing device lost its connection via the binaural link to the other hearing device.

20. The system of claim 1, wherein the binaural link is a wireless, inductive, link.

21. The system of claim 1, wherein the hearing devices are electro-acoustic hearing aids or auditory prosthesis devices.

22. The system of claim 1, wherein the external device is one of a phone device, a personal computer, a tablet computer, a radio device, a music or media player, a TV set, a wireless microphone or a generic remote control.

23. A method of providing hearing assistance to a user wearing a first hearing device at a first one of the user's ears and a second hearing device at a second one of the user's ears, each hearing device being adapted to establish a binaural data link between the first hearing device and the second hearing device and comprising a BLUETOOTH® interface for wireless reception of an external audio data stream from an external audio source device, the method comprising:
 defining, by data exchange between the hearing devices via the binaural link, a first set of BLUETOOTH® profiles assigned to the first hearing device and a second set of BLUETOOTH® profiles assigned to the second hearing device, with the first set and the second set differing by at least one profile,
 establishing a BLUETOOTH® connection between the first hearing device and the external device, with the first hearing device advertising the first set of BLUETOOTH® profiles to the external device, and a BLUETOOTH® connection between the second hearing device and the external device, with the second hearing device advertising the second set of Bluetooth profiles to the external device,
 modifying, by data exchange between the hearing devices via the binaural link, the first and second set of BLUETOOTH profiles by moving at least one of the profiles from one of the sets to the other set in order to obtain a modified first set of profiles and a modified second set of profiles, once at least one of the hearing devices finds a given mode switching criterion to be fulfilled, and advertising the modified first and second set to the external device.

* * * * *